United States Patent
Nakamura

(10) Patent No.: US 9,630,490 B2
(45) Date of Patent: Apr. 25, 2017

(54) FILLER PIPE MOUNTING STRUCTURE

(71) Applicant: YACHIYO INDUSTRY CO., LTD., Sayama-shi, Saitama (JP)

(72) Inventor: Kazuhiro Nakamura, Saitama (JP)

(73) Assignee: YACHIYO INDUSTRY CO., LTD., Sayama-Shi (JP)

( * ) Notice: Subject to any disclaimer, the term of this patent is extended or adjusted under 35 U.S.C. 154(b) by 42 days.

(21) Appl. No.: 14/427,752

(22) PCT Filed: Oct. 29, 2013

(86) PCT No.: PCT/JP2013/079181
§ 371 (c)(1),
(2) Date: Mar. 12, 2015

(87) PCT Pub. No.: WO2014/069425
PCT Pub. Date: May 8, 2014

(65) Prior Publication Data
US 2015/0239339 A1    Aug. 27, 2015

(30) Foreign Application Priority Data

Oct. 29, 2012    (JP) .................................. 2012-237605

(51) Int. Cl.
*F16L 5/02*    (2006.01)
*B60K 15/04*    (2006.01)
(Continued)

(52) U.S. Cl.
CPC ................ *B60K 15/04* (2013.01); *F16L 5/02* (2013.01); *B60K 2015/03453* (2013.01);
(Continued)

(58) Field of Classification Search
CPC .. F16L 5/02; F16L 5/027; F16L 15/04; B60K 2015/0477; B60K 2015/0458;
(Continued)

(56) References Cited

U.S. PATENT DOCUMENTS 4,093,280 A * 6/1978 Yoshizawa ............ F16L 15/008
285/423
4,682,797 A * 7/1987 Hildner ................... F16L 47/16
285/21.2
(Continued)

FOREIGN PATENT DOCUMENTS

JP     S6441431 U    3/1989
JP     5-34413       8/1993
(Continued)

OTHER PUBLICATIONS

International Search Report dated Jan. 14, 2014, Application No. PCT/JP2013/079181, 2 pages.
(Continued)

*Primary Examiner* — David E Bochna
(74) *Attorney, Agent, or Firm* — Rankin, Hill & Clark LLP

(57) ABSTRACT

A filler pipe mounting structure that suppresses permeation of the fuel constituents and that provides ease of mounting. The filler pipe mounting structure includes a resin fuel tank including a projecting cylindrical neck; a fastening member including an embedded section and a joining section, the embedded section being embedded in the neck along a circumferential direction thereof, the joining section formed on the embedded section and exposed from an inner wall of the neck; a mounting member disposed on an end portion of a filler tube and attached to an inner side of the fastening member, the filler tube being in communication with the fuel tank; and a seal member placed between the inner wall of the neck and the outer wall of the mounting member.

4 Claims, 5 Drawing Sheets

(51) Int. Cl.
*B60K 15/03* (2006.01)
*F16L 15/04* (2006.01)

(52) U.S. Cl.
CPC ............... *B60K 2015/03493* (2013.01); *B60K 2015/0477* (2013.01); *F16L 5/027* (2013.01); *F16L 15/04* (2013.01)

(58) Field of Classification Search
CPC .......... B60K 2015/03486; B60K 2015/03493; B60K 2015/0432; B60K 2015/0451
USPC ........................................................ 285/423
See application file for complete search history.

(56) References Cited

U.S. PATENT DOCUMENTS

| | | | | |
|---|---|---|---|---|
| 5,366,257 A * | 11/1994 | McPherson | ............ | F16L 47/32 285/423 |
| 5,406,983 A * | 4/1995 | Chambers | ................ | F16L 9/14 138/109 |
| 5,660,206 A * | 8/1997 | Neal | ...................... | B60K 15/04 285/346 |
| 5,799,986 A * | 9/1998 | Corbett | ............... | B29C 45/1671 285/133.21 |
| 6,099,975 A * | 8/2000 | Peterson | ............ | B29C 37/0085 220/694 |
| 6,186,558 B1 * | 2/2001 | Komolrochanaporn | ................... | F16L 55/00 285/148.19 |
| 6,250,686 B1 * | 6/2001 | Becker | .................... | F16L 47/03 285/21.2 |
| 6,866,305 B2 * | 3/2005 | Spears | .................... | F16L 15/08 285/329 |
| 7,017,951 B2 * | 3/2006 | Spears | ................. | F16L 15/001 285/423 |
| 7,597,363 B2 * | 10/2009 | Hikmat | ................... | F16L 47/24 285/290.2 |
| 8,172,275 B2 * | 5/2012 | Sumrall, Jr. | ............. | B21K 1/16 285/423 |
| 8,820,562 B2 * | 9/2014 | Kito | ....................... | B60K 15/04 220/304 |
| 9,169,953 B2 * | 10/2015 | Cavagna | ............... | F16L 25/026 |
| 9,261,215 B2 * | 2/2016 | Kieper | .................... | F16L 47/04 |
| 2002/0047265 A1 * | 4/2002 | Karhu | ..................... | F16L 41/03 285/125.1 |
| 2002/0096228 A1 * | 7/2002 | Stoddart | ................ | B60K 15/04 141/286 |
| 2002/0096880 A1 * | 7/2002 | Schulz | .................... | F16L 55/07 285/133.11 |
| 2004/0069782 A1 * | 4/2004 | Miura | ................ | B60K 15/0406 220/86.2 |
| 2004/0239112 A1 * | 12/2004 | Kertesz | ............... | B29C 45/0013 285/423 |
| 2010/0032436 A1 * | 2/2010 | Gebert | ................... | B60K 15/04 220/601 |
| 2011/0284126 A1 * | 11/2011 | Gamble | ................ | B60K 15/04 141/192 |
| 2015/0375615 A1 * | 12/2015 | Brown | ................... | B60K 15/04 220/86.1 |

FOREIGN PATENT DOCUMENTS

| | | |
|---|---|---|
| JP | 5-42893 | 10/1993 |
| JP | H0542893 Y2 | 10/1993 |
| JP | 2003-205755 | 7/2003 |
| JP | 2004-284462 | 10/2004 |
| JP | 2009-092180 | 4/2009 |
| KR | 20050122027 A | 12/2005 |

OTHER PUBLICATIONS

Chinese Office Action dated Oct. 10, 2016 with English Translation, 9 pages.

* cited by examiner

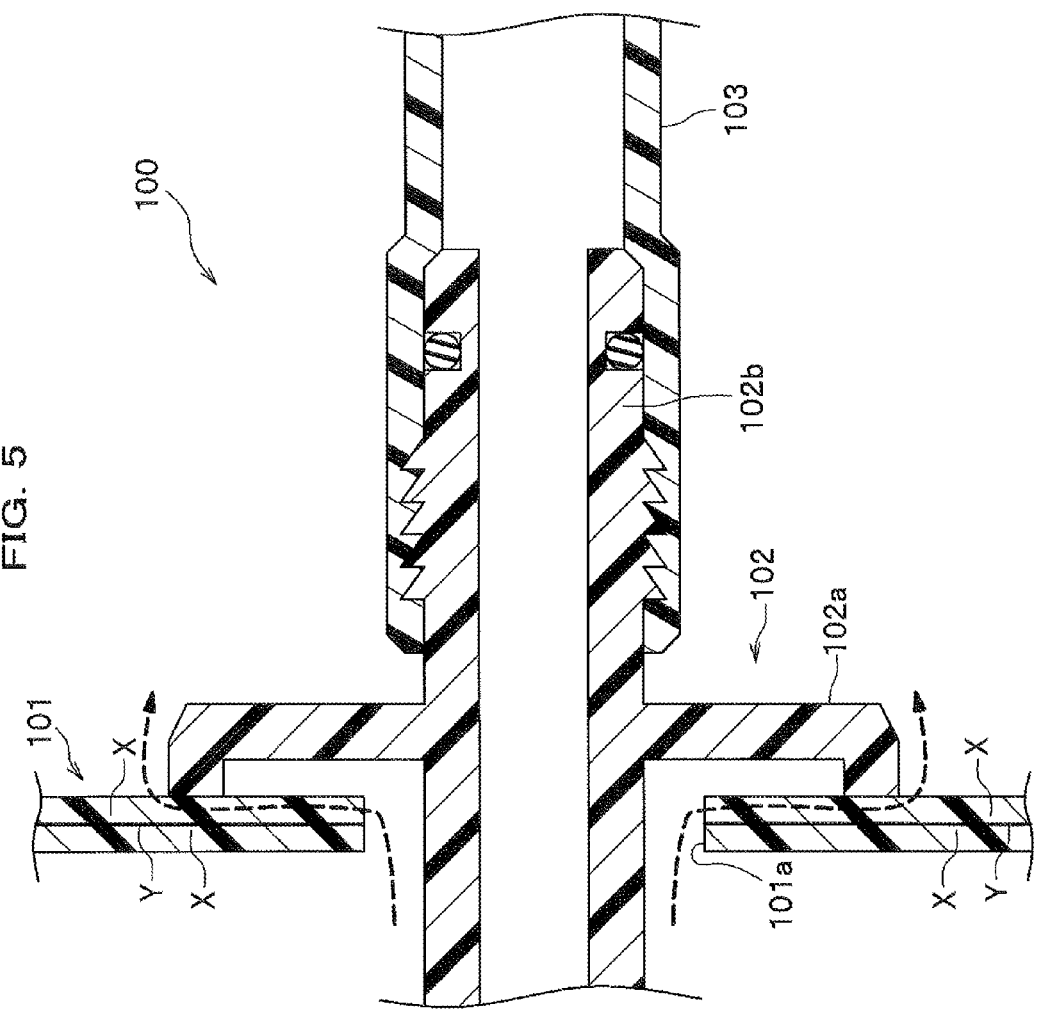

FILLER PIPE MOUNTING STRUCTURE

TECHNICAL FIELD

The present invention relates to a filler pipe mounting structure.

BACKGROUND ART

Patent document 1 discloses a filler pipe mounting structure with a filler pipe mounted on a resin fuel tank. FIG. 5 is a cross sectional view showing a conventional filler pipe mounting structure. The filler pipe mounting structure 100 is mainly composed of: a mounting member 102 fixed to a sidewall of a fuel tank 101; and a filler tube 103 fitted over an end of the mounting member 102. The filler tube 103 is a component of a filler pipe located at the end thereof on the side of the fuel tank 101.

The mounting member 102 includes: a flange 102a that covers an opening 101a formed in the sidewall of the fuel tank 101; and a filler-tube connecting section 102b that is cylindrically shaped and extends upright from the flange 102a. The flange 102a is welded to the outer surface of the sidewall of the fuel tank 101 around the peripheral edge of the opening 101a. The sidewall of the fuel tank 101 is made up of resin layers X, X and a barrier layer Y interposed between the resin layers X, X.

RELATED ART DOCUMENT

Patent Document

[Patent document 1] Japanese Laid-Open Patent Application, Publication No. 2009-92180

SUMMARY OF THE INVENTION

Problems to be Solved by the Invention

In the conventional filler pipe mounting structure 100, however, fuel constituents permeate from a section created by cutting the opening 101, through a portion located between the barrier layer Y and the flange 102a, to the outside. Further, the filler pipe mounting structure 100 requires a fuel-tank perforating process and a welding process, resulting in a complicated operation.

The present invention has been made to solve the above-mentioned problems and it is an object of the present invention to provide a filler pipe mounting structure that suppresses permeation of the fuel constituents and that provides ease of mounting.

Means to Solve the Problems

The present invention provides a filler pipe mounting structure including: a resin fuel tank; a fastening member; a mounting member; and a seal member. The resin fuel tank has a projecting cylindrical neck. The fastening member has an embedded section and a joining section. The embedded section is embedded in the neck along a circumferential direction thereof. The joining section is formed on the embedded section and exposed from an inner wall of the neck. The mounting member is disposed on an end portion of a filler pipe and attached to an inner side of the fastening member. The filler pipe is in communication with the fuel tank. The seal member is placed between the inner wall of the neck and the mounting member.

According to the above configuration, the filler pipe can be easily fixed to the fuel tank only by attaching the mounting member disposed on the end portion of the filler pipe to the fastening member embedded in the neck. Furthermore, permeation of the fuel constituents can be suppressed by the seal member that is provided between the inner wall of the neck and the outer wall of the mounting member.

Preferably, the fastening member has a high rigidity compared to the neck, and the seal member is placed in a position that is covered in a base-to-tip direction of the neck by the fastening member.

According to the above configuration, outward inclination of the neck can be prevented, resulting in improved sealing between the seal member and the neck and between the seal member and the base body.

Preferably, the filler pipe mounting structure further includes a seal member placed between an end of the neck and a portion of the mounting member opposed to the end of the neck. According to the above configuration, permeation of the fuel constituents can be suppressed.

Advantageous Effects of the Invention

The filler pipe mounting structure of the present invention suppresses permeation of the fuel constituents and provides ease of mounting.

BRIEF DESCRIPTION OF THE DRAWINGS

FIG. 5 is a cross sectional view of a conventional filler pipe mounting structure.

EMBODIMENTS FOR CARRYING OUT THE INVENTION

First Embodiment

Figure 1:
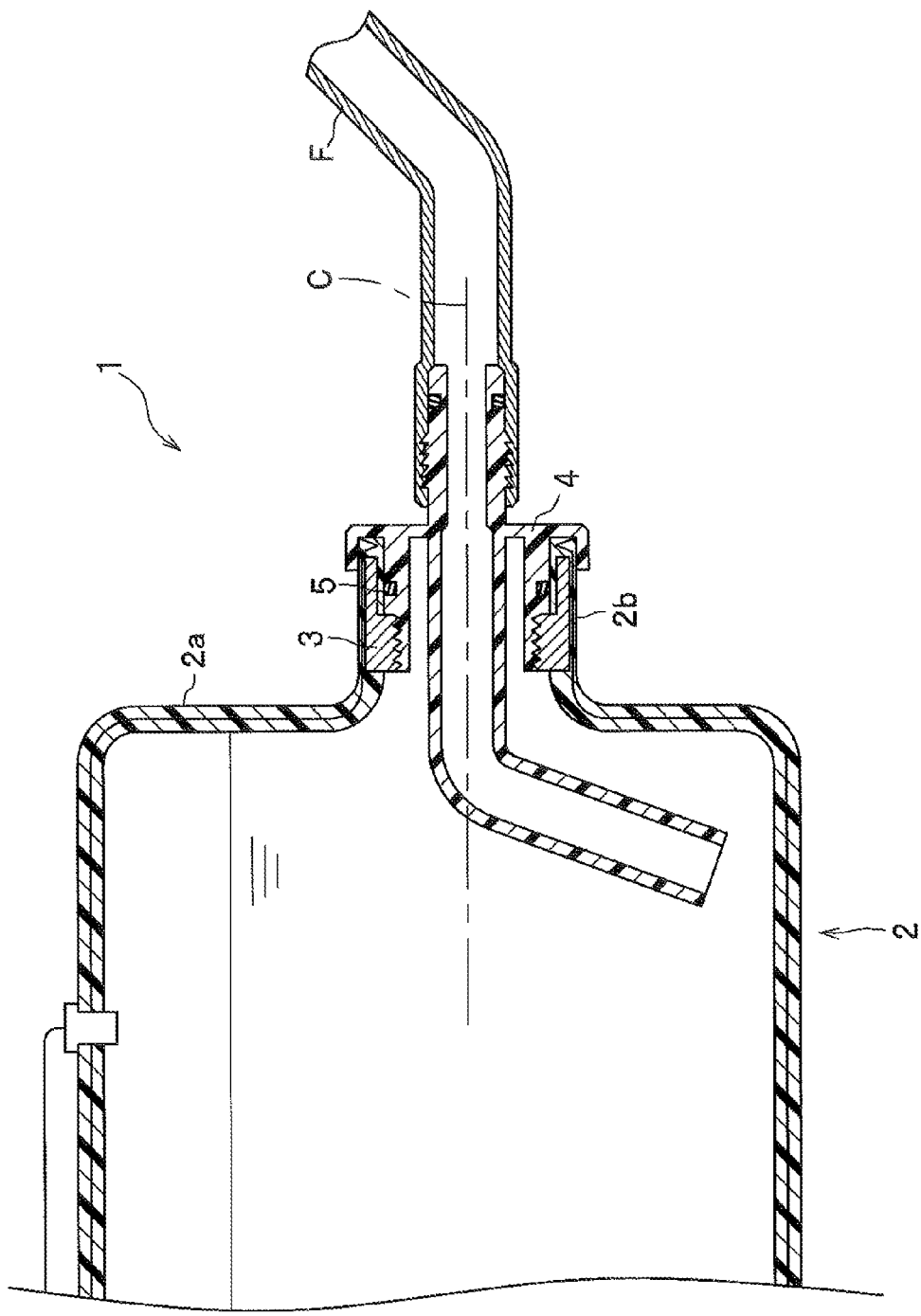
FIG. 1 is an overall cross sectional view of a filler pipe mounting structure according to a first embodiment.

A first embodiment of the present invention will be described in detail with reference to the drawings. As shown in FIG. 1, a filler pipe mounting structure 1 according to the first embodiment includes: a fuel tank 2; a fastening member 3 embedded in a neck 2b of the fuel tank 2; a mounting member 4 attached to the fastening member 3; and a seal member 5. The mounting member 4 is a member configured to be disposed on an end of a filler tube F. Fuel flows through the filler tube F into the fuel tank 2 where it is stored. As used herein, the terms "inner", "internal", "inward" and the like are used to refer to a relation to, or a location of, the region close to a central axis C of the neck 2b and the terms "outer", "external", "outward" and the like are used to refer to a relation to, or a location of, the region distant away from it.

Figure 2:
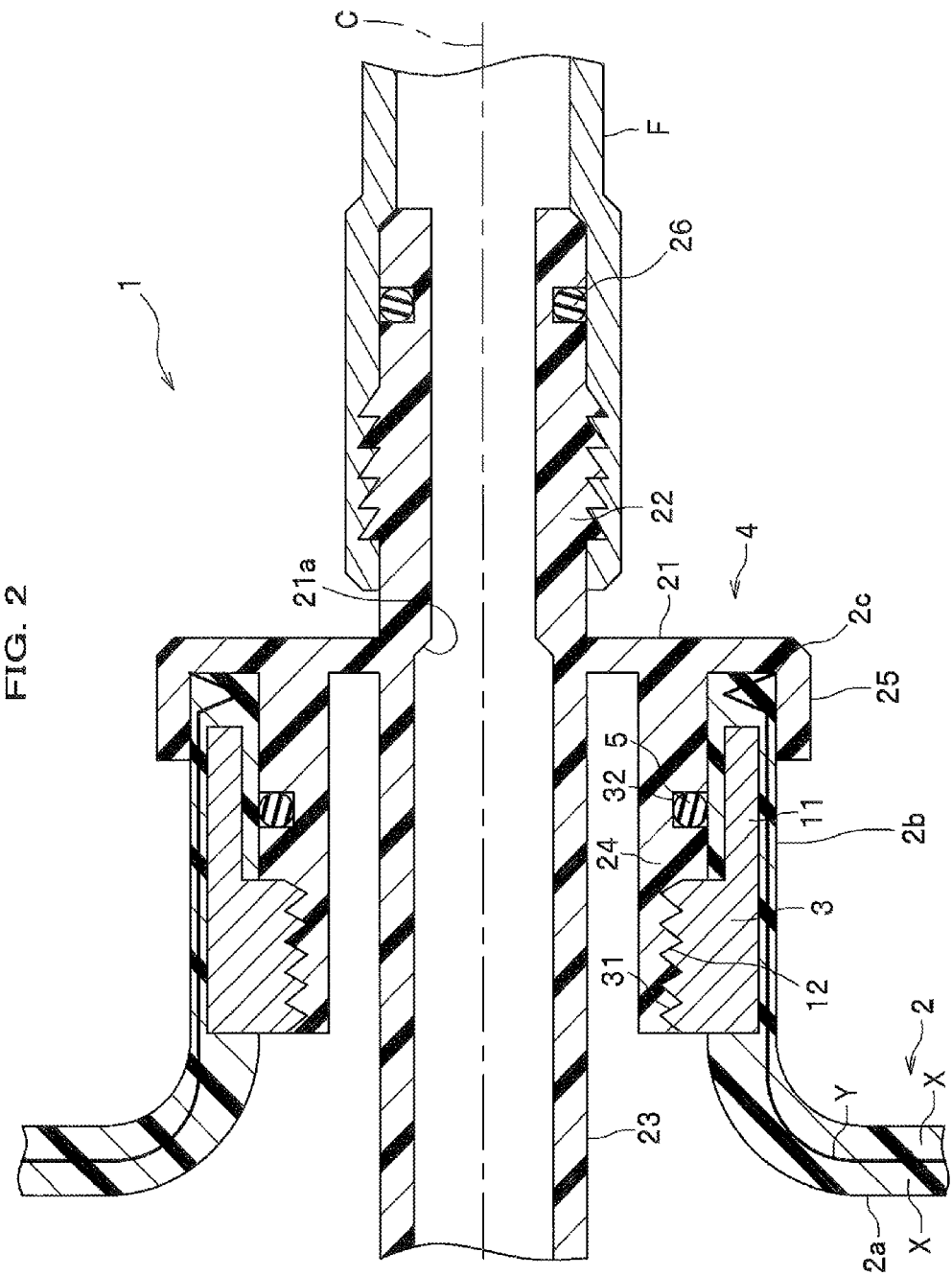
FIG. 2 is an enlarged cross sectional view of an essential part of the filler pipe mounting structure according to the first embodiment.

The fuel tank 2 is a hollow resin container. As shown in FIG. 2, the fuel tank 2 includes a sidewall portion 2a and a neck 2b projecting therefrom. The neck 2b is cylindrically shaped, projecting upright from the sidewall portion 2a toward the filler tube F. The fuel tank 2 includes resin layers X, X and a barrier layer Y sandwiched therebetween. Each resin layer X and the barrier layer Y are bonded together by an adhesive layer interposed therebetween.

The barrier layer Y extends all over the fuel tank 2. At the neck 2b, the barrier layer Y extends along the direction in which the neck 2b projects, up to a corner 2c at the tip of the neck 2b.

As shown in FIG. 2, the fastening member 3 is a member configured to be embedded in the neck 2b and for the mounting member 4 to be attached to it. The fastening member 3 is made up of an embedded section 11 to be embedded in the neck 2b and a first joining section 12 formed on the embedded section 11. The material for the fastening member 3 is not particularly limited, but may be chosen appropriately from among resins, metals and the like. In the first embodiment, the fastening member 3 is made of metal. The fastening member 3 is preferably made of a material having a high rigidity compared to the one that makes the neck 2b.

The embedded section 11 is a cylindrically shaped member to be completely embedded in the neck 2b. The first joining section 12 is located downstream from the embedded section 11 in the fuel inflow direction, and expands inwardly such that a tip portion in the expansion direction of the first joining section 12 is exposed from the inner wall of the neck 2b. Female threads are formed on the tip portion in the expansion direction of the first joining section 12.

The mounting member 4 is a member to be disposed on an end of the filler tube F and attached to the fastening member 3. According to the first embodiment, a filler pipe, not shown, is composed of, in order from the side of the fuel tank 2, the mounting member 4, the filler tube F, a connector and a pipe portion. The filler pipe is a cylindrical assembly configured to conduct the fuel from a refueling port to the fuel tank. The material for the mounting member 4 is not particularly limited, but may be chosen appropriately from among resins and metals. In the first embodiment, the mounting member 4 is made of resin. The mounting member 4 is mainly composed of a flange 21, a connecting section 22, a pipe 23, a base body 24, and a support 25.

The flange 21 has a shape of a ring with a same diameter as the outer diameter of the neck 2b. A hole 21a in the flange 21 is that for the fuel to flow through.

The connecting section 22 is a cylindrical section extending upright from the flange 21 into the filler tube F. A tip portion of the connecting section 22 is formed with a shape of a fir tree configured for connection with an end of the filler tube F. Fitted around the tip portion of the connecting section 22 is a seal member 26 embodied as an O ring. The seal member 26 is a member configured to seal the connection clearance between the connecting section 22 and the filler tube F. The seal member 26 may be omitted.

The pipe 23 is a cylindrical section extending from the flange 21 in the direction opposite to the filler tube F. As shown in FIG. 1, the pipe 23 extends approximately parallel to the neck 2b and then curves, approaching the bottom of the fuel tank 2.

As shown in FIG. 2, the base body 24 is a cylindrical section extending from the flange 21 in the direction opposite to the filler tube F. The base body 24 is located outside of the pipe 23. The base body 24 has an outer diameter approximately the same as the inner diameter of the neck 2b. The tip of the base body 24 is a free end. A second joining section 31 is formed on the outer wall at a tip portion of the base body 24. The second joining section 31 is embodied as male threads. A reception trench 32 for placing the seal member 5 therein is formed circumferentially in the outer wall of the base body 24 at a position closer to the base of the base body 24 than the second joining section 31.

The seal member 5 is an O ring for sealing a clearance between the outer wall of the base body 24 and the inner wall of the neck 2b. The seal member 5 is placed in a position that is covered by the fastening member 3 in the direction from the base to the tip of the neck 2b.

The support 25 is a cylindrical section extending from the flange 21 in the direction opposite to the filler tube F. The support 25 has an inner diameter approximately the same as the outer diameter of the neck 2b so that the inner wall of the support 25 abuts on the outer wall of the neck 2b. The length of the support 25 is not particularly limited, but the support 25 preferably extends as far as the support 25 overlaps the fastening member 3 in the direction from the base to the tip of the neck 2b.

Now, description will be made of mounting (production) of the filler pipe mounting structure 1. First, a fuel tank 2 embedded with a fastening member 3 is produced. There is no particular limitation on how to produce the fuel tank 2 embedded with the fastening member 3, but in the first embodiment, blow molding is employed.

First, a fastening member 3 is temporarily retained by a blow pin via, for example, a ball coupler and then, positioned within a parison inside a split mold. Subsequently, the mold is closed causing the fastening member 3 to be trapped in the parison (resin), and then the air is blown into the parison, pushing the parison out onto the mold. When the air blowing is finished, the blow pin is drawn out of the mold while releasing it from the state in which it is temporary retained by the fastening member 3, thereby obtaining the fuel tank 2 with the embedded section 11 of the fastening member 3 embedded in the neck 2b and with the first joining section 12 exposed from the neck 2b.

In the first embodiment, the barrier layer Y extends along the direction in which the neck 2b projects, up to the corner 2c at the end of the neck 2b, because during the blow molding there is no running of the barrier layer Y into a neck portion between the fastening member 3 and the base body 24. In the first embodiment, the barrier layer Y extends up to the corner 2c, but not necessarily need to do so, and may terminate at a location other than the corner 2c (for example, at the outer wall of the neck 2b or at the end surface of the neck 2b).

Note that the production of the fuel tank 2 embedded with the fastening member 3 may be made by injection molding, for example, by setting a fastening member 3 in a mold, then closing the mold and filling resin in it.

After the production of the fuel tank 2 embedded with the fastening member 3, the seal member 5 is placed into the reception trench 32 formed in the mounting member 4. Then, a mounting member 4 having a filler tube F connected thereto is screwed with the fastening member 3, whereby the mounting member 4 is attached to the fastening member 3, the end surface of the neck 2*b* being abutted on a corresponding surface of the flange 21 and the opening of the neck 2*b* being closed. Thus, the filler pipe mounting structure 1 is completed.

According to the above described filler pipe mounting structure 1, fixing the filler tube F to the fuel tank 2 is easy since it only requires attaching the mounting member 4 disposed on an end of the filler tube F to the fastening member 3 embedded in the neck 2*b*. Further, there is no need to perform a perforating process as required conventionally, which results in reduced operation processes. Also, there is no need either to perform a welding process as required conventionally, which eliminates the use of welding devices and the like.

Furthermore, since the seal member 5 is provided between the inner wall of the neck 2*b* and the outer wall of the mounting member 4, permeation of the fuel constituents can be suppressed.

Moreover, while the neck 2*b* is made of resin and its tip is a free end, and thus the tip portion of the neck 2*b* is apt to be inclined outwardly when subjected to pressure from inside the fuel tank 2. However, in the first embodiment since the fastening member 3 is made of a material having a high rigidity compared to the one that makes the neck 2*b*, the outward inclination of the neck 2*b* can be prevented. Moreover, the seal member 5 is placed in a position that is covered by the fastening member 3 in the direction from the base to the tip of the neck 2*b*, resulting in improved sealing between the seal member 5 and the neck 2*b* and between the seal member 5 and the base body 24.

Furthermore, according to the first embodiment, the barrier layer Y extends up to the corner 2*c* of the neck 2*b*, spanning a long distance from the seal member 5 to the corner 2*c*. Moreover, the flange 21 overlies the tip of the neck 2*b*. This also ensures the suppression of permeation of the fuel constituents.

Furthermore, according to the first embodiment, the support 25 abuts on the outer wall of the neck 2*b*, ensuring a reduced inclination of the tip portion of the neck 2*b* which is a portion more deformable than others.

Moreover, a pipe having a complicated shape, such as the pipe 23 of the first embodiment, which curves relative to the central axis C of the neck 2*b* is difficult to weld to the fuel tank 2. According to the first embodiment, however, the pipe 23 can be easily fixed to the fuel tank 2 no matter what shape the pipe 23 has, only by screwing the mounting member 4 on the fastening member 3, which provides improved freedom of design for the mounting member 4.

Second Embodiment

Now, with reference to FIG. 3, a filler pipe mounting structure 1A according to a second embodiment will be described. The filler pipe mounting structure 1A differs from the filler pipe mounting structure 1 of the first embodiment in that it has two seal members provided between the neck 2*b* and the mounting member 4. In the following description of the second embodiment, like components are denoted by like reference numerals and explanations thereof will be omitted; explanations will be mainly made on differences only.

Figure 3:
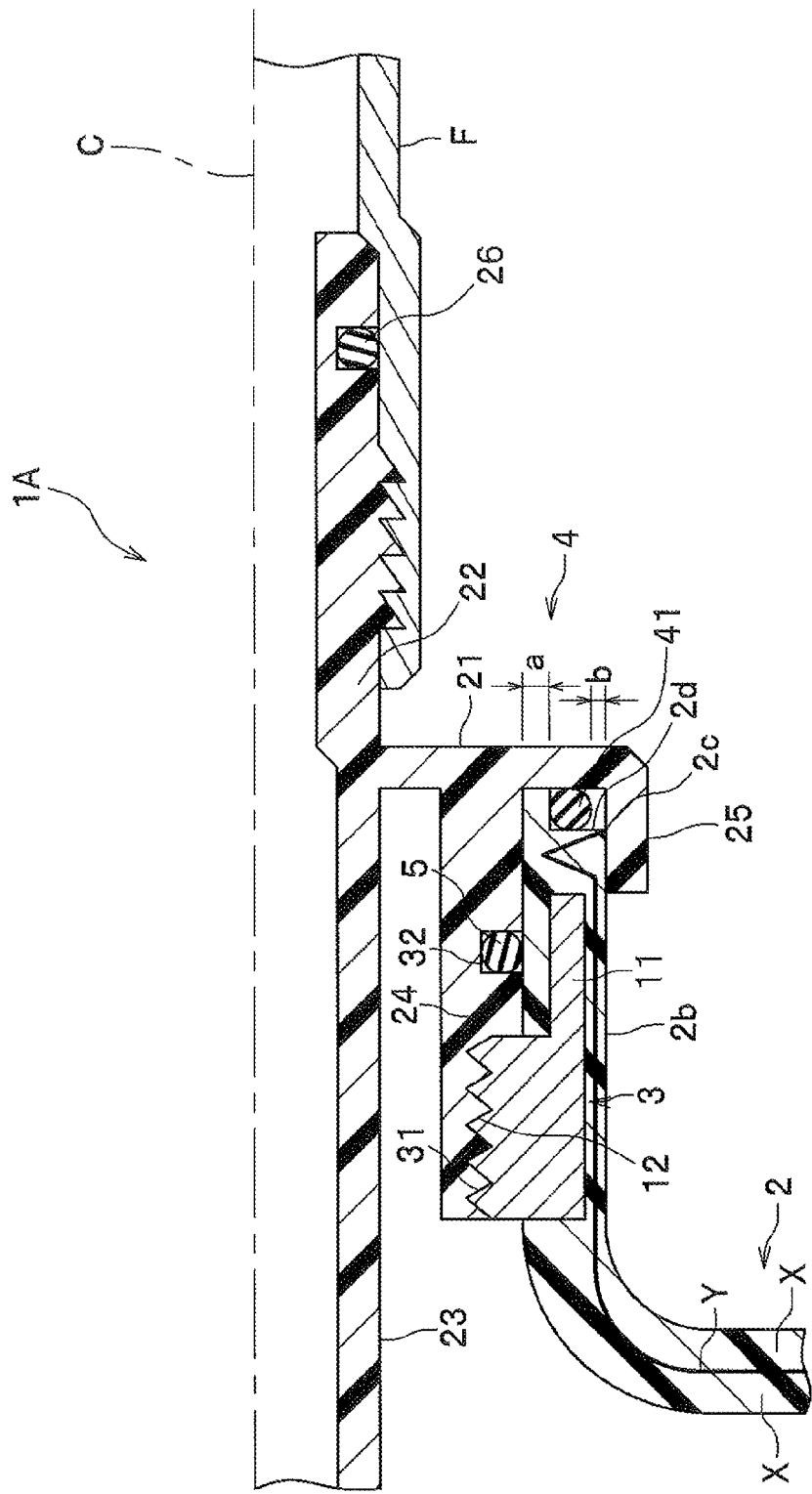
FIG. 3 is an enlarged cross sectional view of an essential part of a filler pipe mounting structure according to a second embodiment.

As shown in FIG. 3, the tip of the neck 2*b* is formed with a reception trench 2*d* for receiving a seal member 41 (a second seal member 41) therein. The reception trench 2*d* is formed by cutting out a portion rectangular in a cross sectional shape circumferentially along the outer edge of the neck 2*b*.

The seal member 41 is an O ring which is a member for sealing the clearance between the end of the neck 2*b* and the flange 21.

According to the filler pipe mounting structure 1A of the second embodiment, the seal member 5 (the first seal member 5) seals the clearance between the neck 2*b* and the base body 24, and the seal member 41 (the second seal member 41) seals the clearance between the neck 2*b* and the flange 21, which results in suppressed permeation of the fuel constituents.

Note that a distance b between the outermost point of circumference of the seal member 41 and the outer wall of the neck 2*b* is preferably the same as or smaller than a distance a between the inner wall of the neck 2*b* and the inner wall of the embedded section 11. With this configuration, the passage for the fuel constituents is narrowed, which suppresses permeation of the fuel constituents.

Third Embodiment

Now, with reference to FIG. 4, a filler pipe mounting structure 1B according to a third embodiment will be described. The filler pipe mounting structure 1B differs from the filler pipe mounting structure 1 in that the mounting member 4 is snap-fitted into the fastening member 3. In the following description of the third embodiment, like components are denoted by like reference numerals and explanations thereof will be omitted; explanations will be mainly made on differences only.

Figure 4:
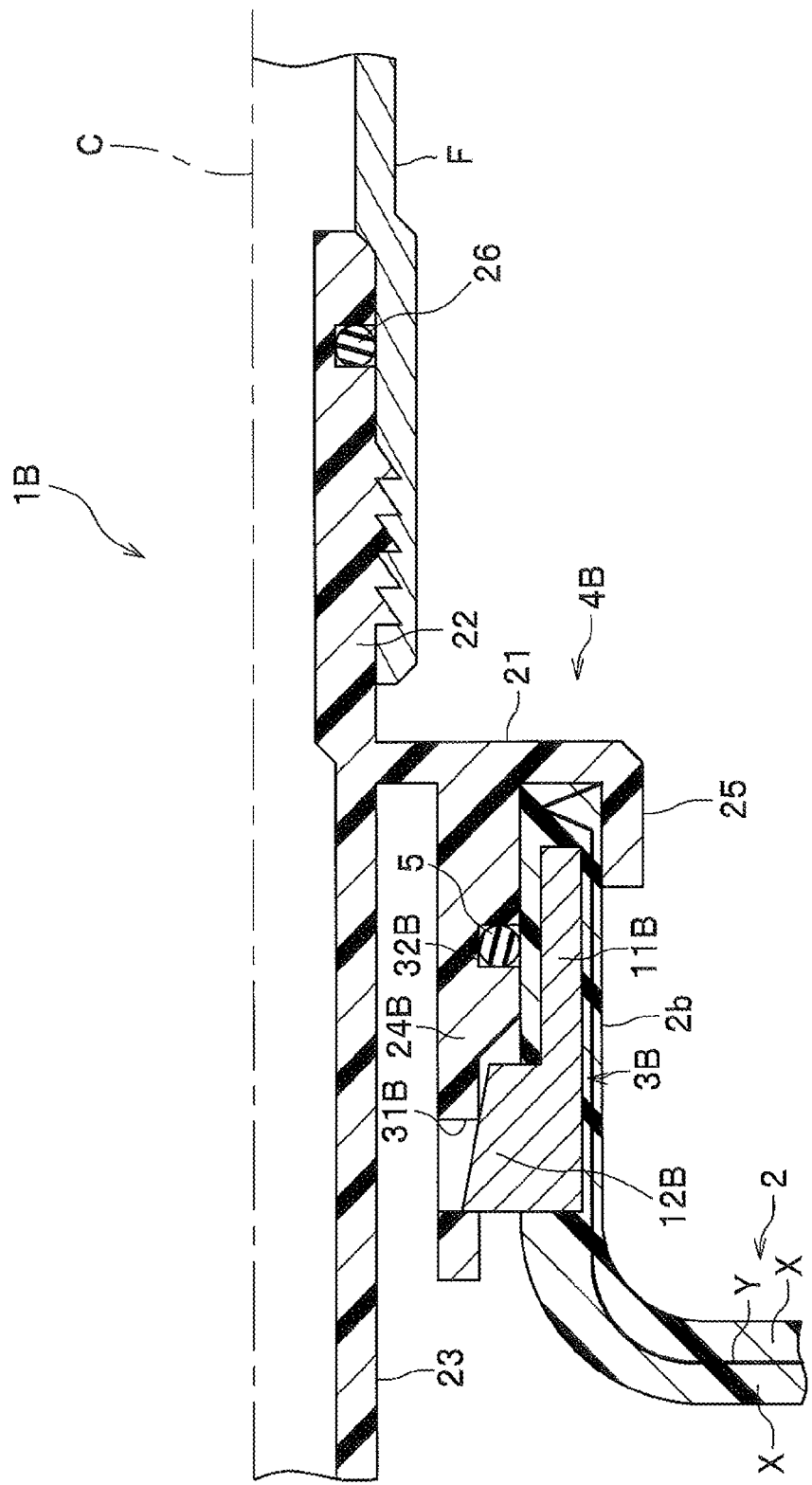
FIG. 4 is an enlarged cross sectional view of an essential part of a filler pipe mounting structure according to a third embodiment.

As shown in FIG. 4, a fastening member 3B is a member configured to be embedded in the neck 2*b* and for a mounting member 4B to be attached to it. The fastening member 3B is made up of an embedded section 11B to be embedded in the neck 2*b* and a first joining section 12B formed on the embedded section 11B. In the third embodiment, the fastening member 3B is made of resin.

The embedded section 11B is a cylindrically shaped member to be completely embedded in the neck 2*b*. A first joining section 12B is located downstream in the fuel inflow direction from the embedded section 11B, and expanded inwardly such that a tip portion in the expansion direction of the first joining section 12B is exposed from the inner wall of the neck 2*b*. An inclined surface is formed on the tip portion in the expansion direction of the first joining section 12B. The inclined surface is inclined such as to go away increasingly from the central axis C as it approaches the filler tube F.

A base body 24B is a cylindrical section extending from the flange 21 in the direction opposite to the filler tube F. The base body 24B has a tip portion that is thinned compared to its base portion so as to be elastically deformable. The tip portion of the base body 24B has a second joining section 31B embodied as a locking slot.

As the mounting member 4B is inserted increasingly deeper into the fastening member 3B, the tip portion of base body 24B slides along the inclined surface of the first joining section 12B, elastically being deformed inwardly. As the mounting member 4B is advanced further, the first joining section 12B locks into the second joining section 31B, bringing the base body 24B to its original shape. In this way, the mounting member 4B can be secured to the fastening member 3B.

In the first embodiment, the mounting member 4 is attached to the fastening member 3 by screwing. The attachment, however, may be made by snap-fit by pushing the mounting member 4B into the fastening member 3B, as in the third embodiment. The snap-fit permits single-push attachment and also improves freedom of design of the pipe 23.

While the embodiments of the present invention have been described, there could be many alternations and modifications without departing from the present invention. For example, the fuel tank 2, which in the embodiments is made up of the resin layers X, X and the barrier layer Y, may be made of other materials if its base material is resin.

EXPLANATION OF REFERENCE NUMERALS 1 filler pipe mounting structure
2 fuel tank
2a sidewall portion
2b neck
3 fastening member
4 mounting member
5 seal member (first seal member)
11 embedded section
12 first joining section
21 flange
22 connecting section
23 pipe
24 base body
25 support
26 seal member
31 second joining section
32 reception trench
41 seal member (second seal member)
C central axis
F filler tube
X resin layer
Y barrier layer

The invention claimed is:

1. A filler pipe mounting structure comprising:
    a resin fuel tank including an integrally formed projecting cylindrical neck;
    a fastening member including
        an embedded section embedded in the neck at an end side thereof and
        a joining section formed continuously from the embedded section and exposed from an inner wall at a base side of the neck;
    a mounting member disposed on an end portion of a filler pipe and attached to the fastening member via the joining section thereof, the filler pipe being in communication with the fuel tank; and
    a seal member disposed upstream in a fuel inflow direction from the joining section and abutting on the inner wall of the neck and on the mounting member.

2. The filler pipe mounting structure of claim 1, wherein the fastening member has a high rigidity compared to the neck, and
    wherein the seal member overlays the fastening member in a base-to-tip direction of the neck.

3. The filler pipe mounting structure of claim 2, further comprising a second seal member placed between an end of the neck and a portion of the mounting member opposed to the end of the neck.

4. The filler pipe mounting structure of claim 1, further comprising a second seal member placed between an end of the neck and a portion of the mounting member opposed to the end of the neck.

* * * * *